United States Patent [19]

Scharting et al.

[11] Patent Number: 4,720,197

[45] Date of Patent: Jan. 19, 1988

[54] BALL SLEEVE FOR GUIDING AXIALLY DISPLACEABLE PARTS

[75] Inventors: Gunter Scharting, Gochsheim; Bernhard Breuer, Bergrheinfeld, both of Fed. Rep. of Germany

[73] Assignee: FAG Kugelfischer Georg Schafer (KGaA), Fed. Rep. of Germany

[21] Appl. No.: 928,848

[22] Filed: Nov. 7, 1986

[30] Foreign Application Priority Data

Nov. 9, 1985 [DE]  Fed. Rep. of Germany ....... 3539860

[51] Int. Cl.⁴ ...................... F16C 29/04; F16C 33/46; F16F 1/06
[52] U.S. Cl. ..................................... 384/49; 267/166; 384/51; 384/526
[58] Field of Search ....................... 384/30, 49, 51, 54, 384/523, 526; 267/166, 169, 170; 464/178, 167

[56] References Cited

U.S. PATENT DOCUMENTS

| | | | |
|---|---|---|---|
| 2,833,598 | 5/1958 | Sloyan | 384/49 |
| 2,981,571 | 4/1961 | Martens | 384/49 |
| 3,186,779 | 6/1965 | Chapman et al. | 384/535 |
| 3,253,868 | 5/1966 | Danly | 384/30 |
| 3,279,218 | 10/1966 | Chocholek et al. | 464/167 |
| 3,927,919 | 12/1975 | Bunzli | 384/51 |
| 4,103,514 | 8/1978 | Grosse-Entrup | 464/167 |
| 4,262,974 | 4/1981 | Tojo et al. | 384/54 |

FOREIGN PATENT DOCUMENTS

| | | | |
|---|---|---|---|
| 871065 | 4/1942 | France | 384/49 |
| 1193175 | 10/1959 | France | 384/49 |
| 617221 | 2/1949 | United Kingdom | 384/49 |
| 914917 | 1/1963 | United Kingdom | 384/49 |

*Primary Examiner*—Stuart S. Levy
*Assistant Examiner*—Thomas R. Hannon
*Attorney, Agent, or Firm*—Ostrolenk, Faber, Gerb & Soffen

[57] ABSTRACT

A ball sleeve for guiding axially displaceable parts includes bearing cage (3) that is formed integrally with coil springs (4), (4) which extend from both axial sides of cage (3).

13 Claims, 4 Drawing Figures

BALL SLEEVE FOR GUIDING AXIALLY DISPLACEABLE PARTS

BACKGROUND OF THE INVENTION

This invention relates to ball sleeves in general and relates more particularly to constructions in which the ball cage is provided with integrally formed springs.

Ball sleeves for guiding longitudinal movement of a rod are disclosed in British Pat. No. 904 315 and Federal Republic of Germany Pat. No. 270 675. These patents disclose a ball cage having axial faces that are acted on by compression springs. In that way the cage is held in its adjusted position and is prevented from axial shifting merely as a result of vibration forces.

Unfortunately, these prior art constructions consist of many individual parts that are expensive to assemble. For instance, many prior art constructions require adjustment rings or lock rings for assembly of the spring and bearing elements. In addition, particularly when plastic cages are used with hardened springs, the latter can work themselves into the faces of the cage.

SUMMARY OF THE INVENTION

This invention solves the foregoing problems of the prior art by integrating the bearing cage with springs on both axial ends or faces thereof. In one embodiment the springs and cage are made integral by molding them of metal plastic. In another embodiment the central portion of a metal tube is provided with ball bearing receiving apertures arranged in two circular arrays about the axis of the tube, and the tube portions axially outboard of the cage are spirally slit and then spread to form coil springs at each end of the cage.

Accordingly, the primary object of this invention is to provide an economical construction for a ball sleeve used to guide a longitudinally movable rod.

Another object of this invention is to provide a novel ball sleeve having springs that are formed integrally with a bearing cage.

Still another object of this invention is to provide a novel ball sleeve in which a bearing cage is molded integrally with springs extending axially from opposite ends thereof.

A further object of this invention is to provide a novel ball sleeve in which the springs and bearing cage comprise a single molded plastic element.

A still further object of this invention is to provide a novel ball sleeve in which the springs and bearing cage comprise a single element fabricated from a tube.

BRIEF DESCRIPTION OF THE DRAWINGS

These objects as well as other objects of this invention shall become readily apparent after reading the following description of the accompanying drawings in which.

DETAILED DESCRIPTION OF THE PREFERRED EMBODIMENTS

Figure 1:
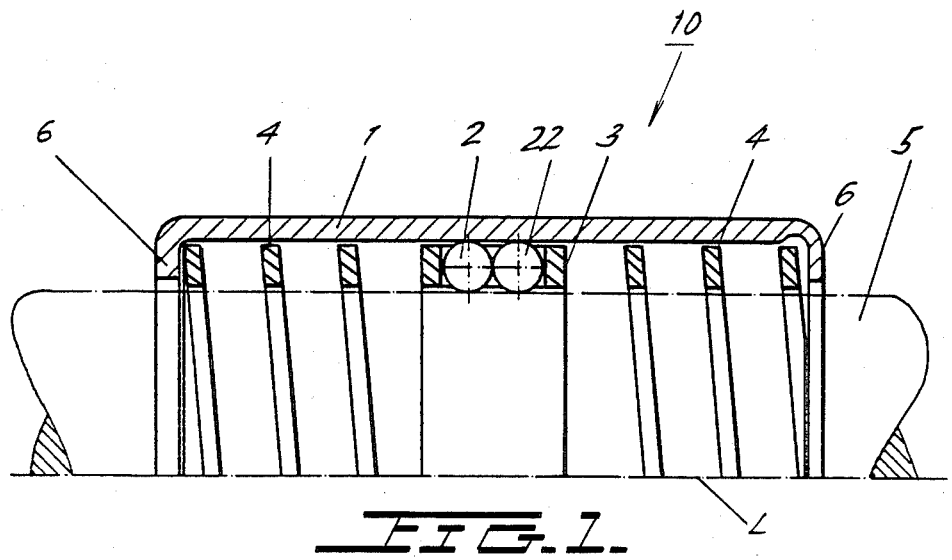
FIG. 1 is half of a longitudinal section through a ball sleeve constructed in accordance with teachings of the instant invention.
Figure 3:
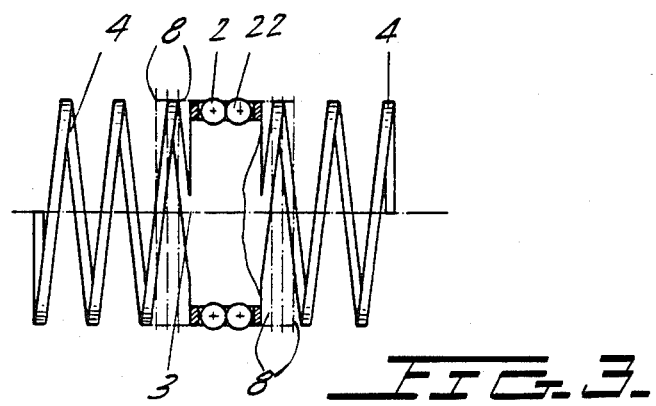
FIG. 3 is a view similar to FIG. 2 showing the manner in which the bearing cage and coil springs of FIG. 1 are constructed.
Figure 4:
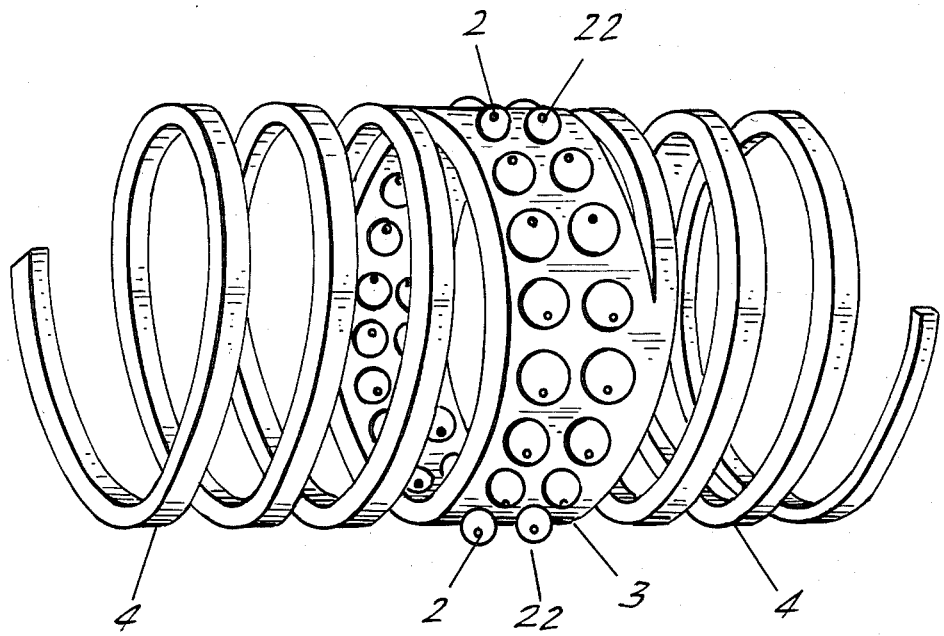
FIG. 4 is a perspective of the elements illustrated in FIG. 3.

Now referring more particularly to FIGS. 1, 3 and 4 which illustrate longitudinally movable guide rod 5 that extends longitudinally through open ended sleeve 1 of ball sleeve unit 10. Disposed within sleeve 1 near the center thereof and surrounding rod 5 is a closed single loop annulus constituting a bearing cage 3 that positions ball bearings in two side-by-side circular arrays 2 and 22. Also disposed within sleeve 1 and surrounding rod 5 are two coil springs 4 that extend from opposite axial faces of cage 3 to retaining lips or collars 6 that are formed by inwardly bending sleeve 1 at the ends thereof.

In accordance with FIG. 3, cage 3 and coil springs 4, 4 that are integral with cage 3 are formed by providing spiral slits 8, 8 (shown by dot-dash lines) at the opposite end sections of a stubby metal tube. Thereafter, slits 8 are spread to form coil springs 4, 4 extending from opposite faces of central bearing cage 3, and then the entire unit is case-hardened by a suitable heat treatment.

Figure 2:
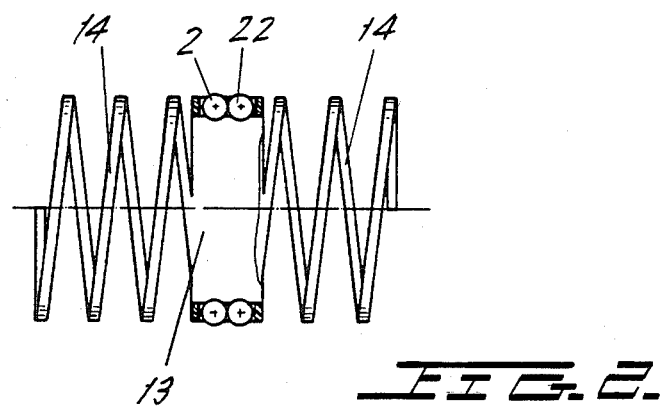
FIG. 2 is a side elevation partially sectioned of the bearing section and coil springs of a ball sleeve constructed in accordance with another embodiment of the instant invention.

In another embodiment of this invention (FIG. 2), bearing cage 13 and springs 14, 14 are formed integrally by injection molding of plastic. A suitable plastic material for this purpose is fiberglass-reinforced, heat-stabilized PA66.

It should now be apparent to those skilled in the art that at least one and possibly both the collars 6, 6 are formed after springs 4, 4 and cage 3 with circular bearing arrays 2, 22 are entered into sleeve 1. It should also now be apparent to those skilled in the art that either or both of the collars 6, 6 may be replaced by a tab that extends inwardly from sleeve 1 so that a spring 4 may bear thereagainst and be retained within sleeve 1.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A device for guiding axially displaceable elements, said device including:
   a sleeve, a rod extending through said sleeve, a plurality of roller bearing elements interposed between said rod and said sleeve, a closed annular constituting cage means positioning said bearing elements in an array surrounding said rod, and coil springs extending from opposite axial sides of said annulus;
   said coil springs being disposed within said sleeve at opposite ends thereof and surrounding said rod;
   said coil springs being formed integrally with said cage means.

2. A device for guiding axially displaceable elements as set forth in claim 1 in which said coil springs and said cage means are constructed of plastic.

3. A device for guiding axially displaceable elements as set forth in claim 2 in which said array includes first and second circular sections disposed in adjacent side by side relationship.

4. A device for guiding axially displaceable elements as set forth in claim 2 in which said coil springs and said cage means are a single injection molding.

5. A device for guiding axially displaceable elements as set forth in claim 4 in which said array includes first and second circular sections disposed in adjacent side by side relationship.

6. A device for guiding axially displaceable elements as set forth in claim 1 in which said coil springs and said cage means are constructed of a sheet metal tube having its ends spirally slit and then axially spread to constitute said coil springs.

7. A device for guiding axially displaceable elements as set forth in claim 6 in which said array includes first and second circular sections disposed in adjacent side by side relationship.

8. A device for guiding axially displaceable elements as set forth in claim 1 in which each end of said sleeve is provided with radially inward extending lip means for retaining said coil springs and said cage means within said sleeve.

9. A device for guiding axially displaceable elements as set forth in claim 8 in which said array includes first and second circular sections disposed in adjacent side by side relationship.

10. A device for guiding axially displaceable elements as set forth in claim 1 in which said array includes first and second circular sections disposed in adjacent side by side relationship.

11. A device for guiding axially displaceable elements as set forth in claim 1 in which the annulus is constituted by a single closed loop.

12. A device for guiding axially displaceable elements as set forth in claim 11 in which the springs are remote from all bearing elements that are interposed between the rod and the sleeve.

13. A device for guiding axially displaceable elements as set forth in claim 1 in which the springs are remote from all bearing elements that are interposed between the rod and the sleeve.

* * * * *